United States Patent
Lupher et al.

(10) Patent No.: US 10,054,852 B2
(45) Date of Patent: Aug. 21, 2018

(54) RIFLE SCOPE, PORTABLE TELESCOPE, AND BINOCULAR DISPLAY DEVICE INCLUDING A NETWORK TRANSCEIVER

(75) Inventors: John Hancock Lupher, Austin, TX (US); John Francis McHale, Austin, TX (US)

(73) Assignee: TRACKINGPOINT, INC., Pflugerville, TX (US)

( * ) Notice: Subject to any disclaimer, the term of this patent is extended or adjusted under 35 U.S.C. 154(b) by 1191 days.

(21) Appl. No.: 13/360,545

(22) Filed: Jan. 27, 2012

(65) Prior Publication Data

US 2013/0194435 A1 Aug. 1, 2013

(51) Int. Cl.
| | |
|---|---|
| *G09G 5/00* | (2006.01) |
| *G02B 23/00* | (2006.01) |
| *G03B 29/00* | (2006.01) |
| *H04N 5/225* | (2006.01) |
| *H04N 5/232* | (2006.01) |
| *F41G 3/16* | (2006.01) |

(52) U.S. Cl.
CPC ............. *G03B 29/00* (2013.01); *F41G 3/165* (2013.01); *H04N 5/2257* (2013.01); *H04N 5/23206* (2013.01)

(58) Field of Classification Search
CPC ............................. F41G 3/2605; H04N 7/185
See application file for complete search history.

(56) References Cited

U.S. PATENT DOCUMENTS

| | | |
|---|---|---|
| 1,955,300 A | 2/1933 | Kurnick |
| 2,144,909 A | 10/1936 | Atkin et al. |
| 2,282,680 A | 5/1942 | Sonne |
| 3,427,102 A | 2/1969 | Wade |
| 4,247,161 A | 1/1981 | Unertl, Jr. |
| 4,309,095 A | 1/1982 | Buckley |
| 4,389,791 A | 6/1983 | Ackerman |
| 4,835,621 A | 5/1989 | Black |
| 4,884,137 A | 11/1989 | Hanson et al. |
| 4,922,801 A | 5/1990 | Jaquard et al. |
| 4,936,190 A | 6/1990 | Pilcher, II |
| 4,970,589 A | 11/1990 | Hanson et al. |
| 5,020,262 A | 6/1991 | Pena |
| 5,026,158 A | 6/1991 | Golubic |
| 5,513,440 A | 5/1996 | Murg |
| 5,557,871 A | 9/1996 | LaLonde |
| 5,834,676 A | 11/1998 | Elliott |
| 5,887,375 A | 3/1999 | Watson |

(Continued)

FOREIGN PATENT DOCUMENTS

IL 1693639 8/2006

OTHER PUBLICATIONS

DigitalHunter Riflescope by ELCAN Optical Technologies, printed from www.elecansportingoptics.com/ProductLine/index.php on Dec. 26, 2011 (1 page).

(Continued)

*Primary Examiner* — Rebecca Volentine

(74) *Attorney, Agent, or Firm* — Cesari & Reed, LLP; R. Michael Reed

(57) ABSTRACT

A rifle scope includes a housing configured to mount to a rifle. The rifle scope further includes a network transceiver within the housing and configured to communicate bi-directionally with at least one of a network and an electronic device configurable to communicate with to the network.

17 Claims, 5 Drawing Sheets

(56) References Cited

U.S. PATENT DOCUMENTS

| | | |
|---|---|---|
| 6,070,355 A | 6/2000 | Day |
| 6,192,614 B1 | 2/2001 | Cliburn |
| 6,556,245 B1 | 4/2003 | Holmberg |
| 6,580,876 B1 | 6/2003 | Gordon |
| 6,598,329 B1 | 7/2003 | Alexander |
| 6,615,531 B1 | 9/2003 | Holberg |
| 6,772,550 B1 | 8/2004 | Leatherwood |
| 6,810,614 B2 | 11/2004 | Phillips et al. |
| 6,901,691 B1 | 6/2005 | Little |
| 7,006,144 B2 | 2/2006 | Holmberg |
| 7,047,863 B2 | 5/2006 | Hawkes et al. |
| 7,506,643 B2 | 3/2009 | Holmberg |
| 7,574,824 B2 | 8/2009 | Holmberg |
| 7,624,526 B2 | 12/2009 | Paasikivi et al. |
| 7,643,132 B2 | 1/2010 | Holmberg |
| 7,739,822 B1 | 6/2010 | Holmberg |
| 7,780,363 B1 | 8/2010 | Holmberg |
| 7,880,793 B2 | 2/2011 | Holmberg |
| 7,965,337 B2 | 6/2011 | Holmberg |
| 8,046,950 B2 | 11/2011 | Holmberg |
| 8,065,807 B2 | 11/2011 | Rucinski |
| 8,678,282 B1* | 3/2014 | Black et al. .................. 235/417 |
| 2002/0007394 A1* | 1/2002 | Bertolus et al. .............. 709/204 |
| 2002/0010026 A1 | 1/2002 | York |
| 2002/0034004 A1 | 3/2002 | Khoshnevis et al. |
| 2002/0078616 A1 | 6/2002 | Perry et al. |
| 2004/0100558 A1* | 5/2004 | Huang ................. H04N 5/2251 348/207.99 |
| 2004/0144013 A1 | 7/2004 | Leatherwood |
| 2005/0132631 A1 | 6/2005 | Bodo |
| 2005/0268521 A1* | 12/2005 | Cox .......................... F41G 1/38 42/130 |
| 2006/0010697 A1* | 1/2006 | Sieracki et al. ................. 33/267 |
| 2006/0082730 A1 | 4/2006 | Franks |
| 2006/0132382 A1* | 6/2006 | Jannard ............................ 345/8 |
| 2007/0115955 A1 | 5/2007 | Byer et al. |
| 2008/0036912 A1* | 2/2008 | Schreiter et al. ............. 348/552 |
| 2008/0094473 A1* | 4/2008 | Rom ..................... F41G 3/2611 348/158 |
| 2008/0151090 A1 | 6/2008 | Becker |
| 2008/0233543 A1* | 9/2008 | Guissin ................... F41A 33/00 434/19 |
| 2009/0092374 A1 | 4/2009 | Kulas |
| 2009/0132527 A1 | 5/2009 | Sheshagiri et al. |
| 2009/0200376 A1* | 8/2009 | Peters ..................... F41G 1/473 235/404 |
| 2009/0251311 A1* | 10/2009 | Smith .................... G06Q 10/00 340/539.13 |
| 2009/0271247 A1 | 10/2009 | Karelin et al. |
| 2010/0095574 A1* | 4/2010 | Abst ......................... F41G 1/35 42/69.01 |
| 2010/0144434 A1 | 6/2010 | Leingang et al. |
| 2010/0277591 A1* | 11/2010 | Kowalsky .............. H04N 7/185 348/158 |
| 2011/0030545 A1* | 2/2011 | Klein ........................... 89/41.05 |
| 2011/0173869 A1 | 7/2011 | Uhm |
| 2011/0209192 A1 | 8/2011 | LeClerc Greer et al. |
| 2011/0238751 A1 | 9/2011 | Bilimpasakis et al. |
| 2011/0241976 A1* | 10/2011 | Boger ................ G02B 27/0172 345/8 |
| 2011/0249122 A1* | 10/2011 | Tricoukes ............ G02B 27/017 348/158 |
| 2012/0122574 A1* | 5/2012 | Fitzpatrick .............. G06T 13/40 463/31 |
| 2012/0214137 A1* | 8/2012 | Goree .................... F41A 17/063 434/19 |
| 2012/0274750 A1* | 11/2012 | Strong ................. G01C 21/165 348/52 |
| 2013/0182010 A2* | 7/2013 | Schoeller et al. ............ 345/633 |

OTHER PUBLICATIONS

European Search Report for EP2620812, dated Jun. 6, 2014.

* cited by examiner

RIFLE SCOPE, PORTABLE TELESCOPE, AND BINOCULAR DISPLAY DEVICE INCLUDING A NETWORK TRANSCEIVER

FIELD

The present disclosure is generally related to portable optical devices, such as rifle scopes, telescopes and binoculars.

BACKGROUND

Conventionally, camera devices have been mounted onto guns to take still videos and/or to capture video. Such camera devices are often mounted to the outside of an optical device, such as a targeting scope, adding to the bulk and weight of the firearm. In another instance, the camera device has been incorporated within the rifle scope. The recorded video or picture can then be recovered from the camera device at a later time, such as by removing the film (or cassette or flash memory device) from the camera to retrieve the images.

SUMMARY

In an embodiment, a rifle scope includes a housing configured to mount to a rifle. The rifle scope further includes a network transceiver within the housing and that is configured to communicate bi-directionally with at least one of a network and an electronic device configurable to communicate with to the network.

In another embodiment, a binocular display device includes a housing having at least one optical element. The binocular display device further includes a network transceiver within the housing configured to communicate bi-directionally with at least one of a network and an electronic device configurable to communicate with to the network.

In still another embodiment, a portable telescope includes a housing including an optical element. The portable telescope further includes a network transceiver within the housing configured to communicate bi-directionally with at least one of a network and an electronic device configurable to communicate with to the network.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of a portable optical device, such as a telescope, binoculars, or a rifle scope, are described below that are configured to capture video and/or audio corresponding to a view area and to share media content with a destination device through a network. As used herein, the term "media content" includes video data, audio data, text data, graphical data, or any combination thereof. In an example, the portable optical device includes video camera functionality, an audio input, and a network transceiver. The portable optical device further includes data processing functionality configured to generate text data and graphical data (such as a reticle). The portable optical device is configured to communicate media content to the destination device through the network.

Figure 1:
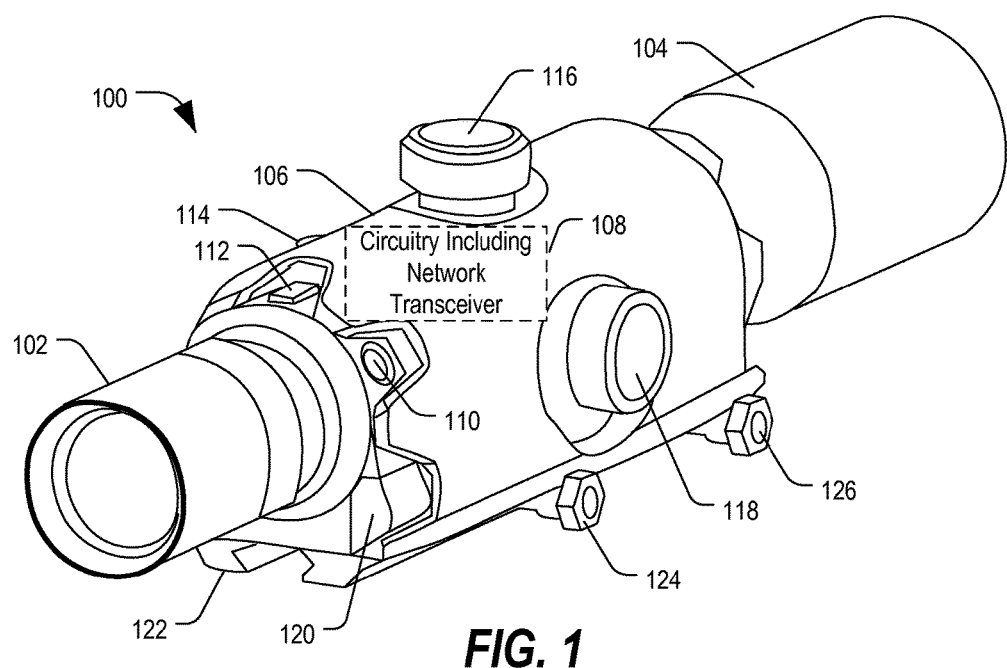
FIG. 1 is a perspective view of an embodiment of a rifle scope having circuitry including a network transceiver.

FIG. 1 is a perspective view of an embodiment of a rifle scope 100 having circuitry 108 including a network transceiver. Rifle scope 100 includes an eyepiece 102 and an optical element 104 coupled to a housing 106. Housing 106 defines an enclosure sized to receive circuitry 108. Optical element 104 includes an objective lens and other components configured to receive light and to direct and focus the light toward optical sensors associated with circuitry 108.

Rifle scope 100 includes user-selectable buttons 110 and 112 on the outside of housing 106 that allow the user to interact with circuitry 108 to select between operating modes, to adjust settings, and so on. Further, rifle scope 100 includes thumbscrews 114, 116, and 118, which allow for manual adjustment of the rifle scope 100. In an example, thumbscrews 114, 116 and 118 can be turned, individually, to adjust the crosshairs within a view area of rifle scope 100.

Housing 106 includes a removable battery cover 120, which secures a battery within housing 106 for supplying power to circuitry 108. Housing 106 is coupled to a mounting structure 122, which is configured to mount to a surface of a rifle and which includes fasteners 124 and 126 that can be tightened to secure the housing to the rifle.

In an example, circuitry 108 includes optical sensors configured to capture video associated with a view area of rifle scope 100 received through optical element 104. Circuitry 108 further includes logic circuitry (such as a digital signal processor (DSP), a micro processor unit (MCU), and/or communications logic) configured to format the captured video into a media content format suitable for transmission through a network, such as a mobile phone network, a satellite communication network, or another wireless communication network using Transport Control Protocol (TCP)/Internet Protocol (IP) communication protocols. In an example, the destination device can be another optical device including another instance of circuitry 108. In an example, a user may attach rifle scope 100 to his/her rifle and carry the system into the field during a hunting expedition. When a user pulls the trigger, movement of the trigger is detected by circuitry 108 causing activation of the optical sensors to capture the video data and may further activate a microphone and audio processing circuitry to capture audio data. The user may configure circuitry 108 to communicate media content to a destination device through a network. The network can be a wireless communication network, such as a cellular, digital, or satellite communication network. In another instance, the network can be a local area network, a wide area network, or a short-range wireless network, such as a Bluetooth® network.

In the above-example, rifle scope 100 is configured to capture and transmit the video and/or audio associated with a view area of the rifle scope to a destination device through the network, allowing the user to share video of his/her hunting experience with another user in real-time or near real-time. In some instances, rifle scope 100 may include a memory configured to store the captured video and/or audio for subsequent transmission, such as when the transceiver establishes a connection to the communications network. One example of image data that may be transmitted through the network connection is described below with respect to FIG. 2.

Figure 2:
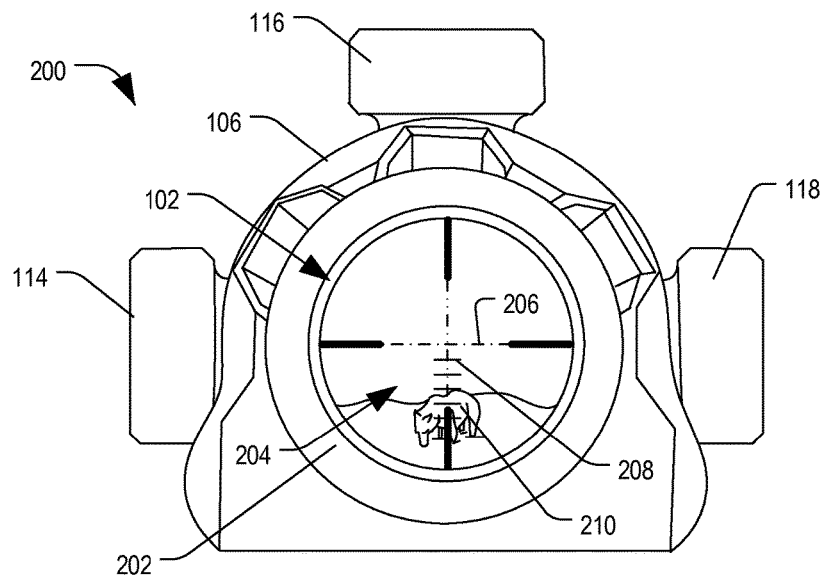
FIG. 2 is front view into the rifle scope of FIG. 1 depicting a view area including a reticle and a potential target.

FIG. 2 is front view 200 into the rifle scope 100 of FIG. 1 depicting a view area 204 including lines 206 and 208 forming a reticle and including a potential target 210. Front view 200 includes thumb screws 114, 116, and 118 and includes housing 106. Front view 200 further includes eyepiece 102 including an adjustable focusing element 202 that is part of the eyepiece 102.

View area 204 can be captured by optical sensors associated with circuitry 108 within housing 106 and converted into video data that can be transmitted wirelessly to a destination device through a network. Circuitry 108 may also include a memory configured to store media content, which can be transmitted at a later time, for example, if a network connection is unavailable. Thus, a user can capture and share the video with a friend or post the video to a server to share with a large number of users. In this way, the user's hunting experience can be shared with others, allowing for social networking of the video associated with a hunt, for example.

Figure 3:
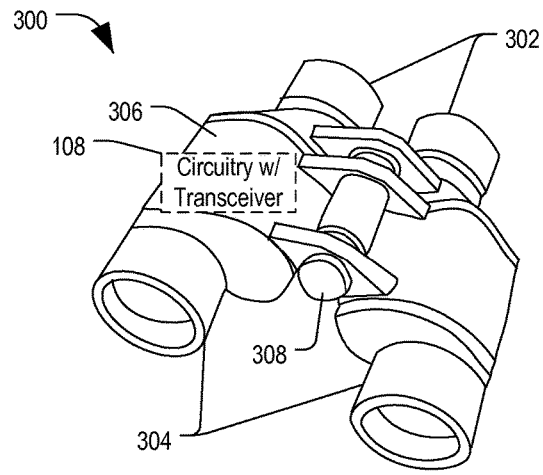
FIG. 3 is a perspective view of a binocular display device having circuitry, including a network transceiver, such as the circuitry of FIG. 1.

FIG. 3 is a perspective view of a binocular display device 300 having circuitry 108 including a network transceiver, such as the circuitry 108 of FIG. 1. In this instance, binocular display device 300 includes eyepieces 302 and optical elements 304 coupled through a housing 306 that may include one or more prismatic components as well as circuitry 108. Binocular display device 300 further includes a binocular adjustment mechanism 308 allowing for physical adjustment of the eyepieces 302 to fit the user.

In this example, circuitry 108 is configured to capture video and/or audio associated with view area that is observed through optical elements 304. In an example, circuitry 108 may include directional microphones configured to capture audio from the view area. Circuitry 108 includes a network transceiver and logic configured to selectively provide media content to a destination device through a network. In some instances, circuitry 108 stores video data, audio data, text, or any combination thereof in a memory. Circuitry 108 may store and transmit the media content concurrently and/or may subsequently transmit the media content when a network connection becomes available and/or in response to an input from the user. Thus, binocular display device 300 can be used to capture and share video and audio information in real-time (when a network connection is available) or at a later time, or both.

In the examples of FIGS. 1-3, a rifle scope and a binocular display device are configured for wireless transmission of video and/or audio data to a destination device. The destination device can be a portable computing device, such as a smart phone, personal digital assistant (PDA), laptop, or tablet computer. The rifle scope 100 and binocular display device 300 are particular examples of portable optical devices. As used herein, the term "portable optical device" refers to an apparatus that can be carried by a user, for example, when walking through a field. In addition to a rifle scope or binocular display device, circuitry 108 with the network transceiver can be incorporated in any portable optical device for capturing video and/or audio data and for providing the captured media content to a destination device. An example of a system including circuitry 108, which can be incorporated in any such portable optical device, is described below with respect to FIG. 4.

Figure 4:
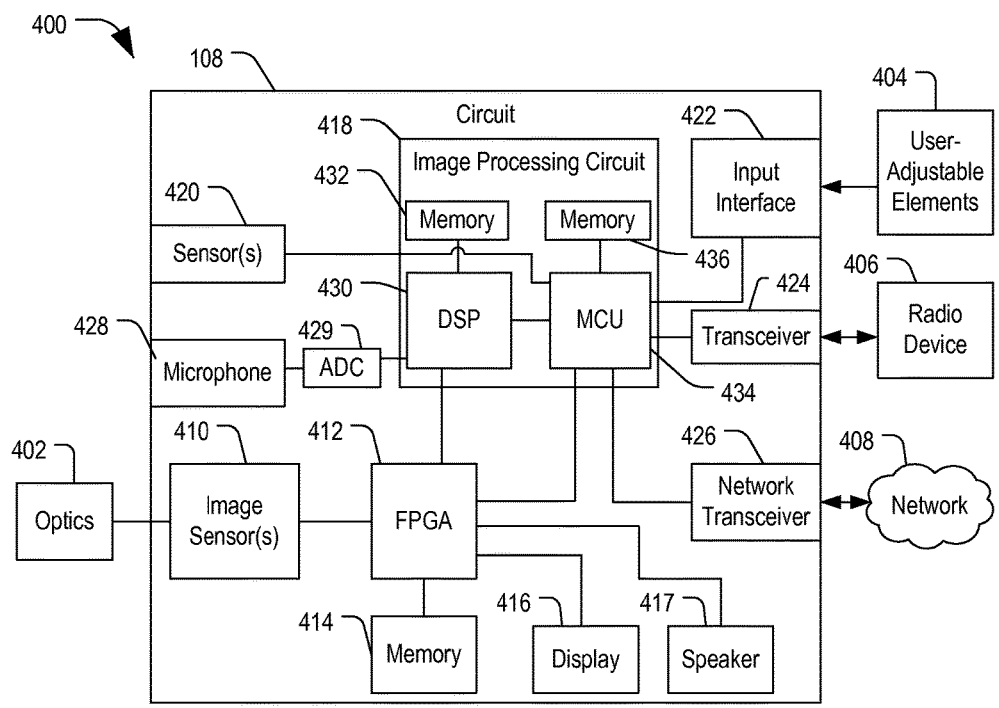
FIG. 4 is a block diagram of a system including the circuitry of FIGS. 1-3.

FIG. 4 is a block diagram of a system 400 including the circuitry 108 of FIGS. 1-3. System 400 includes optical elements 402 configured to direct light toward image (optical) sensors 410 of circuitry 108. System 400 further includes user-selectable elements 404 (such as buttons 110 and 112 and/or thumb screws 114, 116, and 118 in FIG. 1) coupled to an input interface 422 of circuitry 108. System 400 also includes a radio device 406 (such as a hand-held radio frequency (RF) communications device, a portable base station, or another electronic device capable of communicating with a network 408) that is coupled to transceiver 424 through a wired or wireless communications link. System 400 is coupled to network 408 through a network transceiver 426. In an example, circuitry 108 can communicate bi-directionally with network 408 through network transceiver 426 or can communicate bi-directionally with radio device 406, which is configured to couple to network 408 and to facilitate communication between circuitry 108 and network 408. As used herein, the phrase "communicate bi-directionally" refers to the capability of sending data to the network 408 and receiving data from the network 408, not necessarily simultaneously.

Circuitry 108 includes a field programmable gate array (FPGA) 412 including one or more inputs coupled to outputs of image (optical) sensors 410. FPGA 412 further includes an input/output interface coupled to a memory 414, which stores data and instructions. FPGA 412 includes a first output coupled to a display 416 for displaying images and/or text and a second output coupled to a speaker 417. FPGA 412 is also coupled to a digital signal processor (DSP) 430 and a micro controller unit (MCU) 434 of an image processing circuit 418. Circuitry 108 also includes sensors 420 configured to measure one or more environmental parameters (such as wind speed and direction, humidity, temperature, and other environmental parameters) and/or to measure optical elements, such as reflected laser range finding data, and to provide the measurement data to MCU 434. Circuitry 108 further includes a microphone 428 to capture sounds and to convert the sounds into an electrical signal, which it provides to an analog-to-digital converter (ADC) 429. ADC 429 includes an output coupled to an input of DSP 430. In some instances, the microphone 428 may be external to circuitry 108 and circuitry 108 may instead include an audio input jack or interface for receiving an electrical signal from microphone 428. In a particular example, the speaker 417 and microphone 428 may be incorporated in a headset worn by a user that is coupled to circuitry 108 through an input/output interface (not shown).

DSP 430 is coupled to a memory 432 and to MCU 434. MCU 434 is coupled to a memory 436. MCU 434 is also coupled to input interface 422, transceiver 424, and network transceiver 426. In an example, transceiver 424 can be part of an input/output interface, such as a Universal Serial Bus (USB) interface or another wired interface for communicating data to and receiving data from radio device 406, which may be configured to communicate bi-directionally with network 408. In a particular example, transceiver 424 is a wireless transceiver for communicating data to and receiving data from radio device 406. Network transceiver 426 communicates media content to network 408 and receives data and/or media content from network 408. In an example, network 408 can be a communications network, such as the Internet, a wireless telephone network (cellular, digital, or satellite), an ad hoc wireless network, or any combination thereof. In a particular example, circuitry 108 may receive audio data from network 408 and output the audio data to a user through speaker 417 and may send audio data from microphone 428 through network 408, allowing the user to utilize circuitry 108 for full-duplex or half-duplex audio communication. Further, circuitry 108 can communicate media content, such as video and audio of a view area to a destination device through network 408.

In an example, DSP 430 executes instructions stored in memory 432 to process audio data from microphone 428. MCU 434 processes instructions and settings data stored in memory 436 and is configured to control operation of circuitry 108. FPGA 412 is configured to process image data from image (optical) sensors 410. FPGA 412 processes the image data to enhance image quality through digital focusing and gain control. Further, FPGA 412 performs image registration and stabilization. FPGA 412 cooperates with DSP 430 to perform optical target tracking within the view area of the portable optical device that incorporates circuitry 108. FPGA 412 further cooperates with MCU 434 to mix the video data with reticle information and target tracking information (from DSP 430) and provides the resulting image data to display 416. As a target moves within the view area, DSP 430 can perform target tracking and can apply a visual marker to the target as shown on display 416.

In an embodiment, user-selectable elements 404 allow the user to select between live image content captured by image (optical) sensors 410 via optics 402 and stored, pre-processed video from memory 414. For example, the user may elect to view pre-recorded video that was recorded by the user at some point in the past on display 416 to relive his/her hunting experience. Alternatively, the manufacturer may store pre-processed video (for example from a hunt performed by a professional hunter) in memory, allowing the user to view the pre-processed video on display 416. Further, user-selectable elements 404 allow the user to control circuitry 108 to transmit media content to a destination device through network 408. Thus, the user can share captured video data, audio data, text data, graphical data, or any combination thereof with a remote user through network 408. If circuitry 108 is incorporated in a rifle scope, such as rifle scope 100, the user can capture and share video of his/her hunting experience in real-time or near real-time.

In an example where circuitry 108 is incorporated in a rifle scope or optical scope, circuitry 108 can communicate directly with network 408 or can communicate indirectly with network through an intermediate device, such as radio device 406. In some instances, radio device 406 can be configured to communicate directly with other radio devices, forming an ad hoc wireless network or secure network (such as a battlefield network). In one example, circuitry 108 transmits location data, image data, and other information to such radio devices, which information is shared with one or more other radio devices coupled to the ad hoc wireless network or battlefield network.

While the example of FIG. 4 depicted some components of circuitry 108, at least some of the operations of circuitry 108 may be controlled using programmable instructions. In one instance, such instructions may be upgraded and/or replaced using transceiver 424. In one instance, the replacement instructions may be downloaded to a portable storage device, such as a thumb drive or radio device 406, which may then be coupled to transceiver 424. The user may then select and execute the upgrade instructions by interacting with the user-selectable elements 404. An example of portions of circuitry 108 including an expanded view of memories 414, 432, and 436 showing instructions executable by FPGA 410, DSP 430, and MCU 434, respectively, is described below with respect to FIG. 5.

Figure 5:
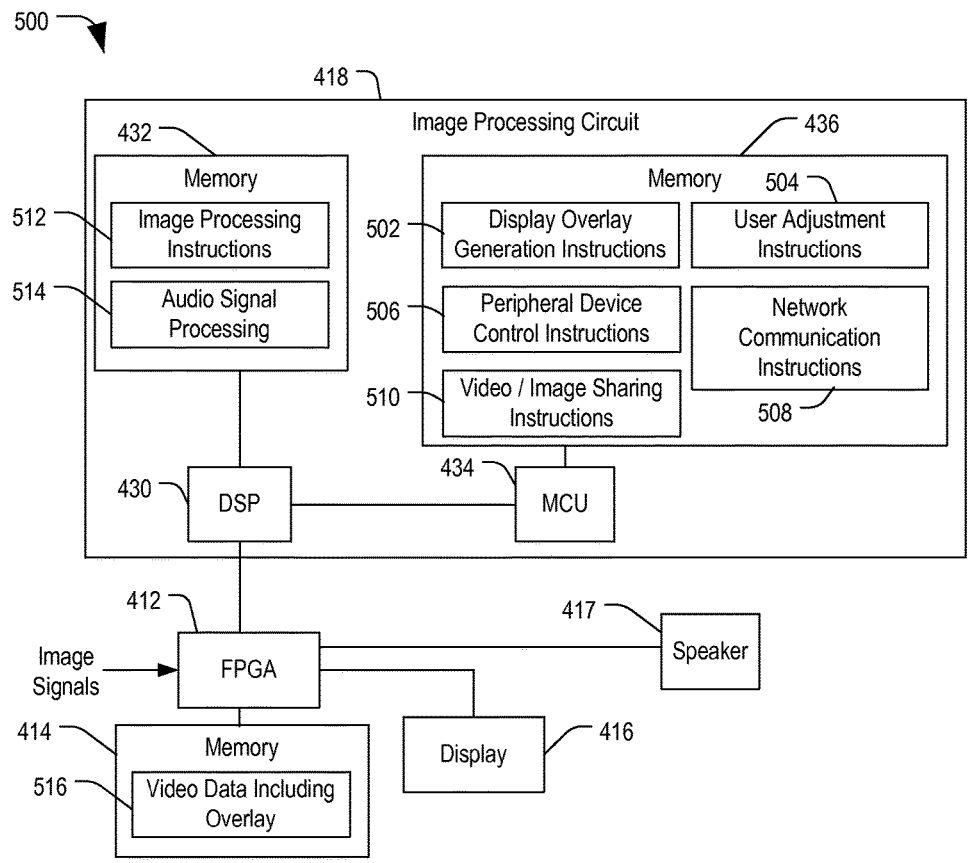
FIG. 5 is an expanded block diagram of a portion of the circuitry of FIGS. 1-4.

FIG. 5 is an expanded block diagram of a portion 500 of the circuitry 108 of FIGS. 1-4. Portion 500 includes image processing circuit 418, FPGA 412, memory 414, display 416, and speaker 417. Image processing circuit 418 includes memories 432 and 436. In this example, memory 436 stores instructions that, when executed by MCU 434, cause MCU 434 to perform operations to control operation of circuitry 108. Memory 436 includes display overlay generation instructions 502 that, when executed, cause MCU 434 to generate a reticle and/or other data that can be provided to display 416 in conjunction with video data. Memory 436 includes user adjustment instructions 504 that, when executed, cause MCU 434 to process inputs received from input interface 422 responsive to adjustments made by a user through user-selectable elements 404. Memory 436 includes peripheral device control instructions 506 that, when executed, cause MCU 434 to control radio device 406 or to control some other electronic device coupled to transceiver 424. Memory 436 also includes network communication instructions 508 that, when executed, cause MCU 434 to communicate media content to a destination device through network 408 via network transceiver 426 or via transceiver 424 through radio device 406. Memory 436 further includes video/image sharing instructions 510 that, when executed, cause MCU 434 to include video data in the media content provided to the destination device in real-time or near real-time and/or to share the media content when network transceiver 426 is able to establish a connection to network 408.

Memory 432 includes image processing instructions 512 that, when executed by DSP 430, cause DSP 430 to perform target tracking with respect to identified objects within a view area. Memory 432 further includes audio signal processing instructions 514 that, when executed, cause DSP 430 to process audio data from microphone 428 and ADC 429.

FPGA 412 is configured to process image/optical data and/or to store video data including overlay information 516 in memory 414. In an example where network transceiver 426 is unable to establish a communications link to network 408, FPGA 412 can store the media content in memory 414 and can retrieve and send the media content at a later time, such as when a communications link is established to network 408.

While the above-examples have described portable optical devices including circuitry 108 in a variety of contexts and in block diagram form, the portable optical device including circuitry 108 can be mounted onto another apparatus, such as a rifle. An example of a rifle scope including the circuitry 108 coupled to a peripheral circuit within a trigger assembly of a rifle is described below with respect to FIG. 6.

Figure 6:
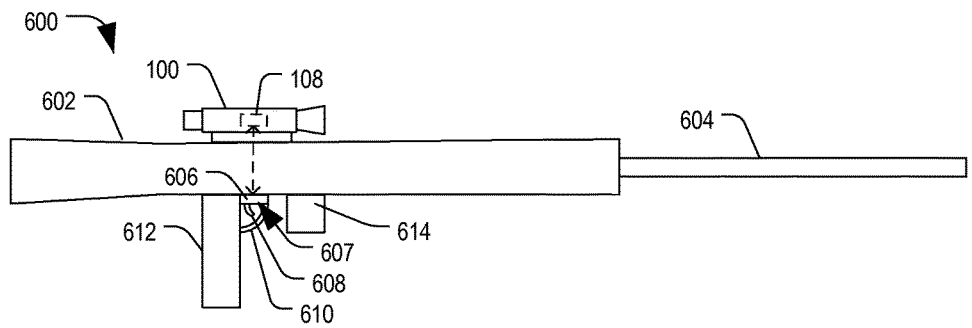
FIG. 6 is a side view of an example of a small arms firearm including the rifle scope of FIG. 1.

FIG. 6 is a side view of an example of a small arms firearm 600 including the rifle scope 100 of FIG. 1. As previously discussed, rifle scope 100 includes circuitry 108 including a network transceiver configured to communicate media content to a network. Rifle scope 100 is mounted to a rifle 602 and aligned with a muzzle 604 of rifle 602 to capture a view area in the target direction. Rifle 602 includes a trigger assembly 606 including peripheral circuit 607 and including a trigger shoe 608 to which a user may apply a force to discharge rifle 602. Rifle 602 further includes a trigger guard 610 and a handle 612 as well as a magazine 614.

In this example, in response to a force applied to trigger shoe 608 by a user, peripheral circuit 607 sends a signal to transceiver 424 of circuitry 108 within rifle scope 100, triggering circuitry 108 to capture video data and/or audio data associated with a view area of rifle scope 100. Circuitry 108 can communicate media content to a destination device through network 408. Further, MCU 434 of circuitry 108 can send and/or receive control signals to peripheral circuit 607.

In the above-discussion, circuitry 108 within a portable optical device includes a network transceiver 426 for communicating media content to one or more devices through a network 408. As previously discussed, media content can include video data, audio data, text data, graphical data, or any combination thereof. An example of a system is described below with respect to FIG. 7 that includes integrated circuit 108 configured to communicate with one or more remote devices through network 408.

Figure 7:
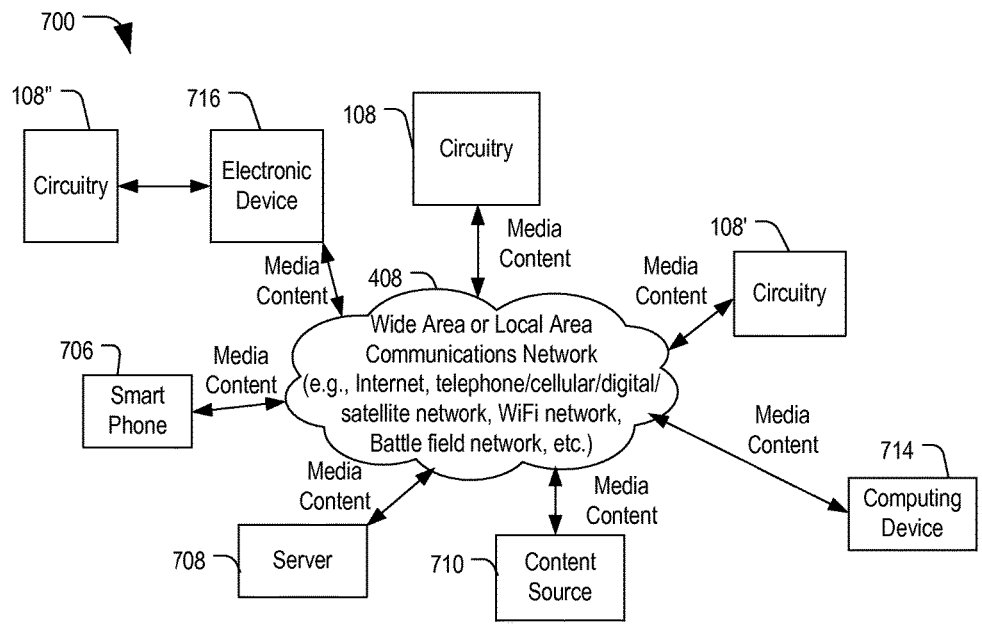
FIG. 7 is a block diagram of a system including the circuitry of FIGS. 1-6 configured to communicate with one or more devices through a communications network.

FIG. 7 is a block diagram of a system 700 including the circuitry 108 of FIGS. 1-6 configured to communicate with one or more devices through communications network 408. System 700 includes a smart phone 706, a computer server 708, a content source 710, and a computing device 712, which are communicatively coupled to circuitry 108 through communications network 408. Circuitry 108 may be coupled to another instance of circuitry 108, identified as circuitry 108', within another optical device through communications network 408. Further, a third instance of circuitry 108, labeled as circuitry 108", is configured to communicate with an electronic device 716 through a wired or wireless link. Electronic device 716 can be a smart phone, a personal digital assistant, a computing device, a field radio (such as a military radio), a router, a satellite uplink, or some other electronic device that is configurable to communicate bi-directionally with network 408 and to communicate bi-directionally with circuitry 108" to facilitate communication between circuitry 108" and other devices (or circuitry 108' and/or circuitry 108) through network 408. As used herein, the term "content source" refers to a device configured to store and share media content with other devices coupled to communications network 408. In an example, content source 710 can be a networked hard disk coupled to communications network 408. Further, as used herein, the term "computing device" refers to any electronic device configurable to couple to communications network 408 and to execute instructions, such as Internet browser applications, image rendering applications, and the like.

In this example, circuitry 108 captures video data, audio data or any combination thereof (associated with a view area) and/or generates text data and graphical data and communicates media content including at least one of the video, audio, and text data to one or more of smart phone 706, server 708, content source 710, computing device 712, and another instance of circuitry 108'. Network transceiver 426 within circuitry 108 communicates the media content wirelessly to communications network 408, making it possible for the user to capture and share media content with one or more remote users through network 408.

Figure 8:
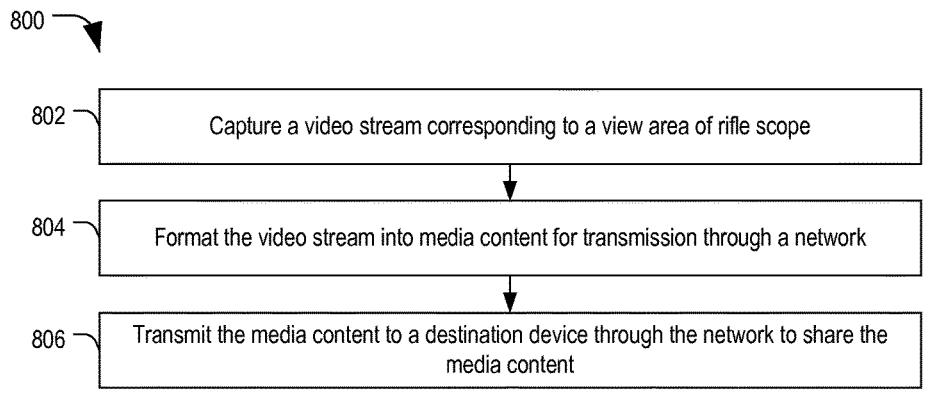
FIG. 8 is a flow diagram of an embodiment of a method of sharing media content from an optical device with a destination device.

FIG. 8 is a flow diagram of an embodiment of a method 800 of sharing video from an optical device with a destination device. At 802, circuitry 108 captures a video stream corresponding to a view area of a rifle scope. Advancing to 804, MCU 434 formats the video stream into media content for transmission through a network, such as communications network 408. In an example, MCU 434 formats the video stream into media content packets for transmission via a TCP/IP network through a direct wireless connection between circuitry 108 and network 408 or through an intermediate device, such as an electronic device 716. Continuing to 806, MCU 434 controls network transceiver 426 (or transceiver 424 and electronic device 716 or radio device 406) to transmit the media content to a destination device through the network 408 to share the video stream.

In an example, the video stream may be formatted and sent as a live media content stream to the destination device through network 408. In an alternative example, such as when a connection to network 408 is unavailable, circuitry 108 may store the media content in a memory, such as memory 414, and may communicate the media content at a later time, such as when the network connection becomes available or in response to a user selection. In still another example, the video stream may be formatted and provided to an electronic device 716 through a wired or wireless connection, and electronic device 716 can send the media content and/or receive media content to and from other devices or other circuitry through network 408.

While the above-examples are directed largely to a portable optical device implementation configured to capture video, it is also possible to display pre-processed video content on the display of the portable optical device and to provide associated audio content to a speaker 417. An example of a method for selectively providing one of the captured video and pre-processed video content to a display is described below with respect to FIG. 9.

Figure 9:
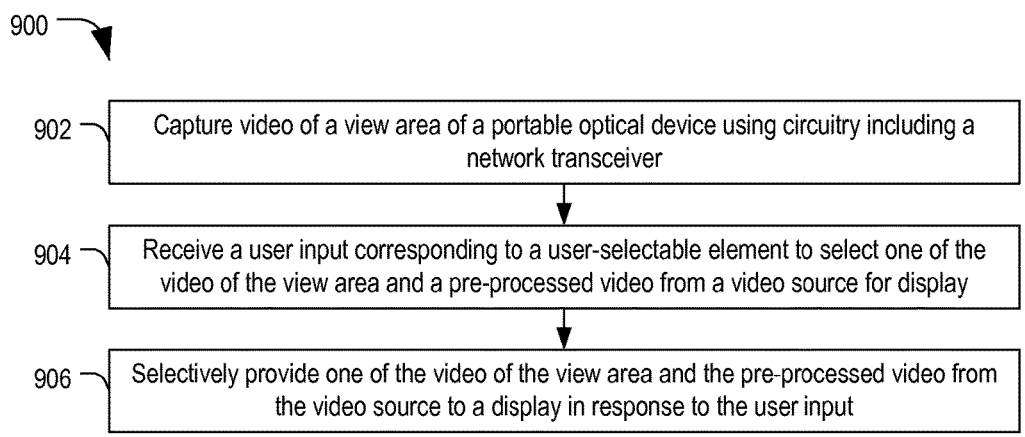
FIG. 9 is a flow diagram of an embodiment of a method of selectively providing media content to a visual display.

FIG. 9 is a flow diagram of an embodiment of a method 900 of selectively providing video content to a visual display. At 902, video of a view area of a portable optical device is captured using circuitry 108, which includes a network transceiver and/or a transceiver configured to communicate through a wired or wireless communication link to electronic device 716, which can communicate with network 408 through a wired or wireless connection. Advancing to 904, circuitry 108 receives user input corresponding to a user-selectable element (such as a button) to select one of the video of the view area and a pre-processed video from a video source for display. In an example, the pre-processed video may be previously recorded video content that was captured by circuitry 108 or video content provided by a manufacturer or other content source. Continuing to 906, circuitry 108 selectively provides one of the video of the view area and the pre-processed video from the video source to a display of the portable optical device in response to the user input. In this example, the user can review stored media content using the display within the portable optical device.

In conjunction with the systems, devices, and methods described above with respect to FIGS. 1-9, circuitry is described that includes optical sensors, a microphone, and a network transceiver. The circuitry is configured to capture video data and audio data associated with a view area and to selectively communicate media content to a destination device through a network, using TCP/IP or other communications protocols. The circuitry enables social networking of media content associated with a view area of a portable optical device, such as a rifle scope, a pair of binoculars, a telescope, or other portable optical device. The media content can be shared in real-time (i.e., live) or at a later time, such as when the network connection becomes available.

Although the present invention has been described with reference to preferred embodiments, workers skilled in the art will recognize that changes may be made in form and detail without departing from the scope of the invention.

What is claimed is:

1. A rifle scope comprising:
   a housing configured to mount to a rifle;
   an optical sensor within the housing configured to capture optical data associated with a view area;
   a display within the housing;
   a control circuit within the housing and coupled the display and to the optical sensor, the control circuit configured to detect movement of a trigger associated with a trigger assembly of the rifle and to activate the optical sensor to capture the optical data in response to detecting the movement, the control circuit including image processing circuitry configured to enhance image quality, perform image registration and stabilization, and perform optical target tracking, the image processing circuitry configured to mix the optical data with reticle information and target tracking information and to produce display data, the control circuit configured to provide the display data to the display; and
   a network transceiver within the housing configured to communicate bi-directionally with at least one of a network and an electronic device configurable to communicate with the network, the network transceiver configured to communicate at least a portion of the optical data to a second rifle scope via the network.

2. The rifle scope of claim 1, wherein the network transceiver is configured to communicate with the network using Transmission Control Protocol (TCP)/Internet Protocol (IP) communication protocols.

3. The rifle scope of claim 1, wherein the electronic device comprises a smart phone that is coupled to the network transceiver through one of a wired connection and a wireless connection and that is configurable to be communicatively coupled to the network through a wireless connection.

4. The rifle scope of claim 1, wherein the network transceiver comprises a wireless transceiver.

5. The rifle scope of claim 1, further comprising:
   a microphone to convert sounds into an audio signal; and
   wherein the network transceiver communicates the audio signal to a destination device through the network.

6. The rifle scope of claim 1, further comprising:
   a memory configured to store the optical data as video data and to store pre-processed video data; and
   image processing circuitry coupled to the at least one image sensor, the memory and the display, the image processing circuitry to selectively provide at least one of the optical data from the optical sensor, the stored optical data from the memory, and the pre-processed video data to the display.

7. A binocular display device comprising:
   a housing including a circuit, the housing including at least one optical element including an objective lens configured to receive light and to direct and focus the light toward the circuit, the circuit including;
      at least one optical sensor configured to capture optical data associated with a view area based on the focused light;
      a directional microphone configured to capture audio data associated with the view area;
      a network transceiver within the housing configured to communicate bi-directionally with a network, the network transceiver configured to communicate at least a portion of the optical data and the audio data to one of a smart phone and a rifle scope through the network;
      a display; and
      a control circuit within the housing and coupled the display and to the optical sensor, the control circuit configured to enhance image quality, perform image registration and stabilization, and perform optical target tracking, the image processing circuitry configured to mix the optical data with reticle information and target tracking information and to produce display data, the control circuit configured to provide the display data to the display.

8. The binocular display device of claim 7, wherein the network transceiver is configured to communicate with the network using Transmission Control Protocol (TCP)/Internet Protocol (IP) communication protocols.

9. The binocular display device of claim 7, wherein the network transceiver comprises a wireless transceiver.

10. A portable telescope comprising:
    a housing including an optical element;
    a circuit within the housing, the circuit including:
       an optical sensor configured to capture optical data;
       a directional microphone configured to capture audio data;
       a network transceiver within the housing configured to communicate bi-directionally with at least one of a network and an electronic device configurable to communicate with the network the network transceiver configured to communicate at least a portion of the optical data and the audio data to one of a smart phone and-a rifle scope through the network;
       a display; and
       a control circuit within the housing and coupled the display and to the optical sensor, the control circuit configured to enhance image quality, perform image registration and stabilization, and perform optical target tracking, the image processing circuitry configured to mix the optical data with reticle information and target tracking information and to produce display data, the control circuit configured to provide the display data to the display.

11. The portable telescope of claim 10, wherein the network transceiver is configured to communicate with the network using Transmission Control Protocol (TCP)/Internet Protocol (IP) communication protocols.

12. The portable telescope of claim 10, wherein the network transceiver sends data to and receives data from a computing device through the network.

13. The portable telescope of claim 10, wherein the housing further includes a mounting structure configured to couple to a rifle.

14. The portable telescope of claim 10, wherein the network transceiver comprises a wireless transceiver.

15. A binocular display device comprising:
    a housing including at least one optical element;
    a circuit including:
       at least one image sensor to capture video of a view area associated with the optical element;
       a display configured to present at least a portion of the video;
       a directional microphone configured to capture audio data corresponding to the view area;
       a processor coupled to the at least one image sensor and the display, the processor configured to process the video to produce the portion and to provide the portion to the display, the processor configured to enhance image quality, perform image registration and stabilization, and perform optical target tracking, the image processing circuitry configured to mix the optical data with reticle information and target tracking information and to produce display data, the control circuit configured to provide the display data to the display; and a network transceiver within the housing configured to communicate bi-directionally with at least one of a network and an electronic device configurable to communicate with the network, wherein the network transceiver communicates at least a portion of the video and the audio data to a circuit of a rifle scope in real-time through the network.

16. The binocular display device of claim 15, further comprising:

a display;

a memory; and image processing circuitry coupled to the display, the memory, and the at least one image sensor, the image processing circuitry configured to provide at least a portion of the video to the display.

17. The binocular display device of claim 16, wherein the image processing circuitry selectively provides the video to the network when a network connection is available and otherwise to the memory for storage.

* * * * *